US008647502B2

(12) United States Patent
Takemura et al.

(10) Patent No.: US 8,647,502 B2
(45) Date of Patent: Feb. 11, 2014

(54) SEWAGE TREATMENT APPARATUS AND SEWAGE REUSE SYSTEM

(75) Inventors: Kiyokazu Takemura, Tokyo (JP); Makoto Onishi, Tokyo (JP); Shinichi Yoshikawa, Tokyo (JP); Masami Ito, Tokyo (JP); Shinjiro Ueda, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 639 days.

(21) Appl. No.: 12/731,446

(22) Filed: Mar. 25, 2010

(65) Prior Publication Data
US 2010/0243544 A1 Sep. 30, 2010

(30) Foreign Application Priority Data
Mar. 25, 2009 (JP) .................................. 2009-074555

(51) Int. Cl.
*C02F 9/14* (2006.01)
(52) U.S. Cl.
USPC ...... 210/104; 210/143; 210/149; 210/170.08; 210/182; 210/257.1; 210/259; 210/920; 210/921
(58) Field of Classification Search
USPC ............... 210/104, 170.01, 170.08, 920, 921, 210/110, 109, 86, 143, 149, 175, 182, 210/257.1, 257.2
See application file for complete search history.

(56) References Cited

U.S. PATENT DOCUMENTS

| | | | | |
|---|---|---|---|---|
| 2,594,433 | A * | 4/1952 | Hess et al. | 210/149 |
| 6,299,775 | B1 * | 10/2001 | Elston | 210/605 |
| 2008/0167931 | A1 * | 7/2008 | Gerstemeier et al. | 705/8 |

FOREIGN PATENT DOCUMENTS

| | | |
|---|---|---|
| CN | 1772649 | 5/2006 |
| CN | 101186416 | 5/2008 |
| JP | 01127098 A * | 5/1989 |
| JP | 05-269466 | 10/1993 |
| JP | 07-328392 | 12/1995 |
| JP | 11-179173 | 7/1999 |
| JP | 2007-237087 | 9/2007 |
| JP | 2008-000705 | 1/2008 |
| JP | 2008-705 | 1/2008 |
| JP | 2008-073622 | 4/2008 |

OTHER PUBLICATIONS

JP Office Action of Appln. No. 2009-074555 dated Mar. 14, 2012.
Chinese office action of Appln. No. 201010147772 dated Aug. 25, 2011 with English translation.
Chinese office action of Appln. No. 201010147772 dated May 3, 2012 with English translation.
Chinese office action of Appln. No. 201010147772 dated Sep. 18, 2012 with English translation.
EP Search Report of Appln. No. 10157343.4 dated Jun. 4, 2013 in English.

* cited by examiner

*Primary Examiner* — Terry Cecil
(74) *Attorney, Agent, or Firm* — Antonelli, Terry, Stout & Kraus, LLP.

(57) ABSTRACT

A sewage treatment apparatus includes a membrane separation active-sludge treating section which performs a biological treatment on a part of sewage, which is introduced by a water introducing section while flowing through a sewer trunk line, to generate first treated sewage; a membrane highly treating section which performs a membrane high treatment on the first treated sewage to generate second treated sewage; a membrane treating tank which stores the first treated sewage; a membrane highly treating tank which stores the second treated sewage; water level sensors which respectively measure water level of the membrane treating tank and the membrane highly treating tank; and a power-control section which controls water introducing quantity of the water introducing section on the basis of the water level data measured by the water level sensors.

8 Claims, 4 Drawing Sheets

FIG. 2

FIG. 3

SEWAGE TREATMENT APPARATUS AND SEWAGE REUSE SYSTEM

BACKGROUND (a) Field of the Invention

The present invention relates to a sewage treatment apparatus which is used in a satellite treatment plant. The sewage treatment apparatus introduces a part of sewage from a sewer trunk line; performs sewage treatment; and supplies reuse water to the neighborhood. The present invention also relates to a sewage reuse system which includes a plurality of sewage treatment apparatuses located in respective satellite treatment plants.

(b) Description of the Related Arts

Conventionally, sewage flowing through a sewer trunk line is treated by a terminal sewage treatment plant in order to generate reuse water. The generated reuse water is supplied to an area on the upstream side. However, the supply of reuse water has become a problem for an area that is far away from the terminal sewage treatment plant but needs water.

Figure 4:
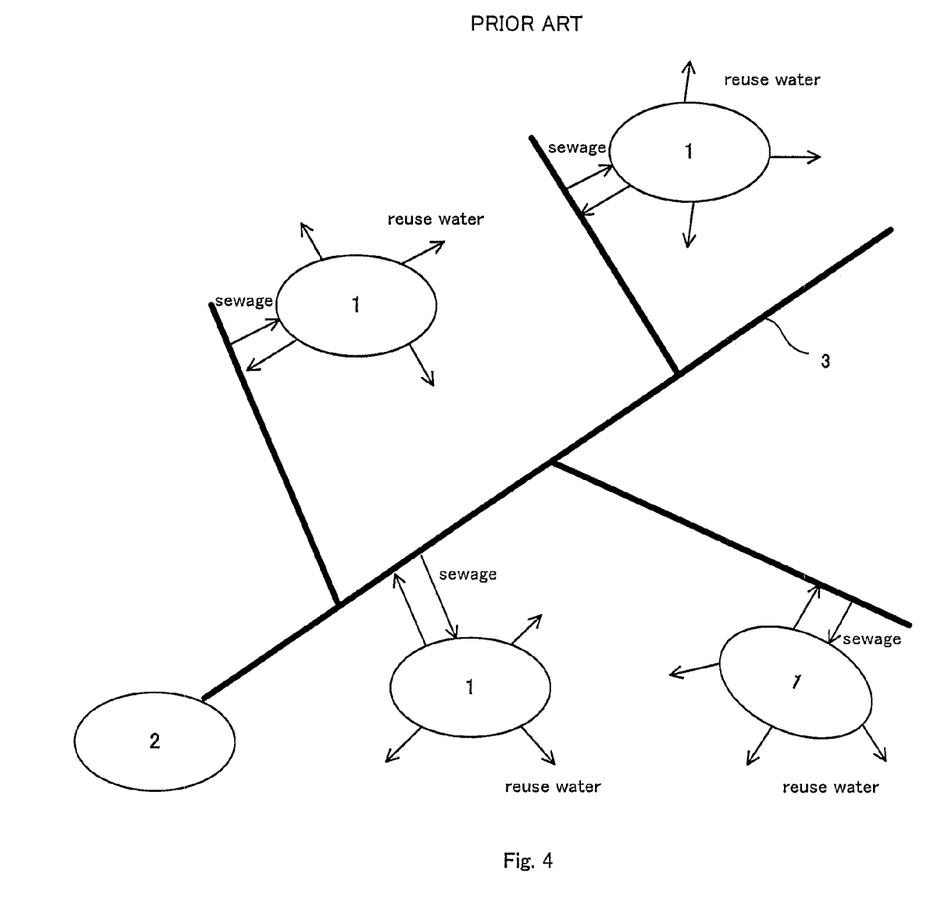
FIG. 4 is an explaining diagram showing a structure of a plurality of satellite treatment plants in prior art.

Then, in recent years, satellite treatment plant, by which sewage can be effectively treated and reused, is put into use. FIG. 4 is an explaining diagram showing a structure of a plurality of satellite treatment plants. As shown in FIG. 4, there is a sewer trunk line 3. A terminal sewage treatment plant 2 is arranged at the end of the sewer trunk line 3, and a plurality of satellite treatment plants 1 are distributed along the sewer trunk line 3. Each satellite treatment plant 1 introduces a part of sewage flowing through the sewer trunk line 3; purifies the sewage in order to generate reuse water; then supplies the generated reuse water to an area that is in the neighborhood of the satellite treatment plant 1 and is in demand for reuse water.

However, because such conventional satellite treatment plan is often located in an urban district where it is difficult to secure ample setting space, it has become a problem to miniaturize the setting space as much as possible.

As disclosed in the Japanese Patent Publication No. 2008-705, the present applicant once proposed a sewage treatment apparatus used in such satellite treatment plant. The Japanese Patent Publication No. 2008-705 describes a sewage treatment apparatus which performs a sewage treatment through combining a high-rate filtering section with a membrane separation active-sludge treating section.

According to the sewage treatment apparatus disclosed in the Japanese Patent Publication No. 2008-705, it is possible to miniaturize the setting space of the whole treatment apparatus, as well as to generate reuse water with high purity.

However, it is necessary to generate reuse water according to the demand of the neighborhood. Furthermore, it is also necessary to prepare water tanks for temporarily storing the generated reuse water according to different purities. Because of that, there is an important project to generate reuse water and control water storing quantity of reuse water according to the demand for reuse water, but this project has not been considered in the Japanese Patent Publication No. 2008-705 mentioned above.

Therefore, in order to accomplish the project mentioned above, the present invention aims to control the water storing quantity of reuse water which is generated by a sewage treatment apparatus of a satellite treatment plant. Furthermore, the present invention also aims to control and adjust water storing quantities in a plurality of sewage treatment apparatuses by a unified management.

SUMMARY

An aspect of the invention is to provide a sewage treatment apparatus, which comprises:

a membrane separation active-sludge treating section which performs a biological treatment on a part of sewage, which is introduced by a water introducing section while flowing through a sewer trunk line, to generate first treated sewage;

a membrane highly treating section which performs a membrane high treatment on said first treated sewage to generate second treated sewage;

a membrane treating tank which stores said first treated sewage;

a membrane highly treating tank which stores said second treated sewage;

water level sensors which respectively measure water level of said membrane treating tank and said membrane highly treating tank; and a power-control section which controls water introducing quantity of said water introducing section on the basis of the water level data measured by said water level sensors.

Furthermore, the power-control section power-control section controls the water introducing quantity on the basis of temperature.

The sewage treatment apparatus of the above type further comprises a power supply which is contained in the power-control section which drives the membrane separation active-sludge treating section and the membrane highly treating section. Waste heat released from said power supply is used by a plurality of heating sections mounted in the membrane separation active-sludge treating section, the membrane treating tank, and the membrane highly treating tank.

Furthermore, concentration sewage produced by said membrane highly treating section is drained back to said sewer trunk line downstream from a water introducing opening formed in said water introducing section.

Another aspect of the invention is to provide a sewage reuse system, which comprises:

a plurality of sewage treatment apparatuses of the above type, which are distributed in an area where there is a sewer trunk line;

a communication section which transmits driving information of respective the sewage treatment apparatus; and a central control section which controls water storing quantity of each membrane treating tank and/or each membrane highly treating tank located in respective the sewage treatment apparatuses, on the basis of demand for reuse water and the driving information transmitted by the communication section.

The sewage reuse system of the above type further comprises a supply section which connects all the membrane treating tanks located in respective the sewage treatment apparatuses with each other, as well as connects all the membrane highly treating tanks located in respective the sewage treatment apparatuses with each other. On the basis of demand for reuse water, the central control section supplies reuse water via the supply section to the membrane treating tank and/or the membrane highly treating tank located in an area where reuse water is in shortage.

With such sewage treatment apparatus of the present invention, it is possible to the store the reuse water generated by the membrane separation active-sludge treating section or the membrane highly treating section according to different purities. It is also possible to control the water storing quantity of the membrane treating tank and/or the membrane highly treating tank on the basis of to the demand for reuse water, the temperature and the water lever data.

Furthermore, because the waste heat released from the power supply is collected and is used by a plurality of heating sections mounted in the membrane separation active-sludge treating section, the membrane treating tank, and the membrane highly treating tank, it is possible to heat the sewage to a proper temperature for the biological treatment in order to raise the efficiency of the biological treatment, as well as to heat the reuse water according to different uses.

Furthermore, because the concentration sewage, which is produced in the membrane highly treating section during the membrane high treatment, is drained back to the sewer trunk line, there is no need to install extra treating device. As a result, the setting space of the whole apparatus can be miniaturized.

With such sewage reuse system of the present invention, it is possible to control and adjust the water storing quantities of the plurality of sewage treatment apparatuses by a unified management.

It is also possible to replenish all the tanks by transferring reuse water from other tanks to a tank located in an area where the reuse water is in shortage, according to the demand for reuse water.

DETAILED DESCRIPTION OF EMBODIMENTS

Embodiments of the present invention will be described in detail hereinbelow with reference to the drawings.

Figure 1:
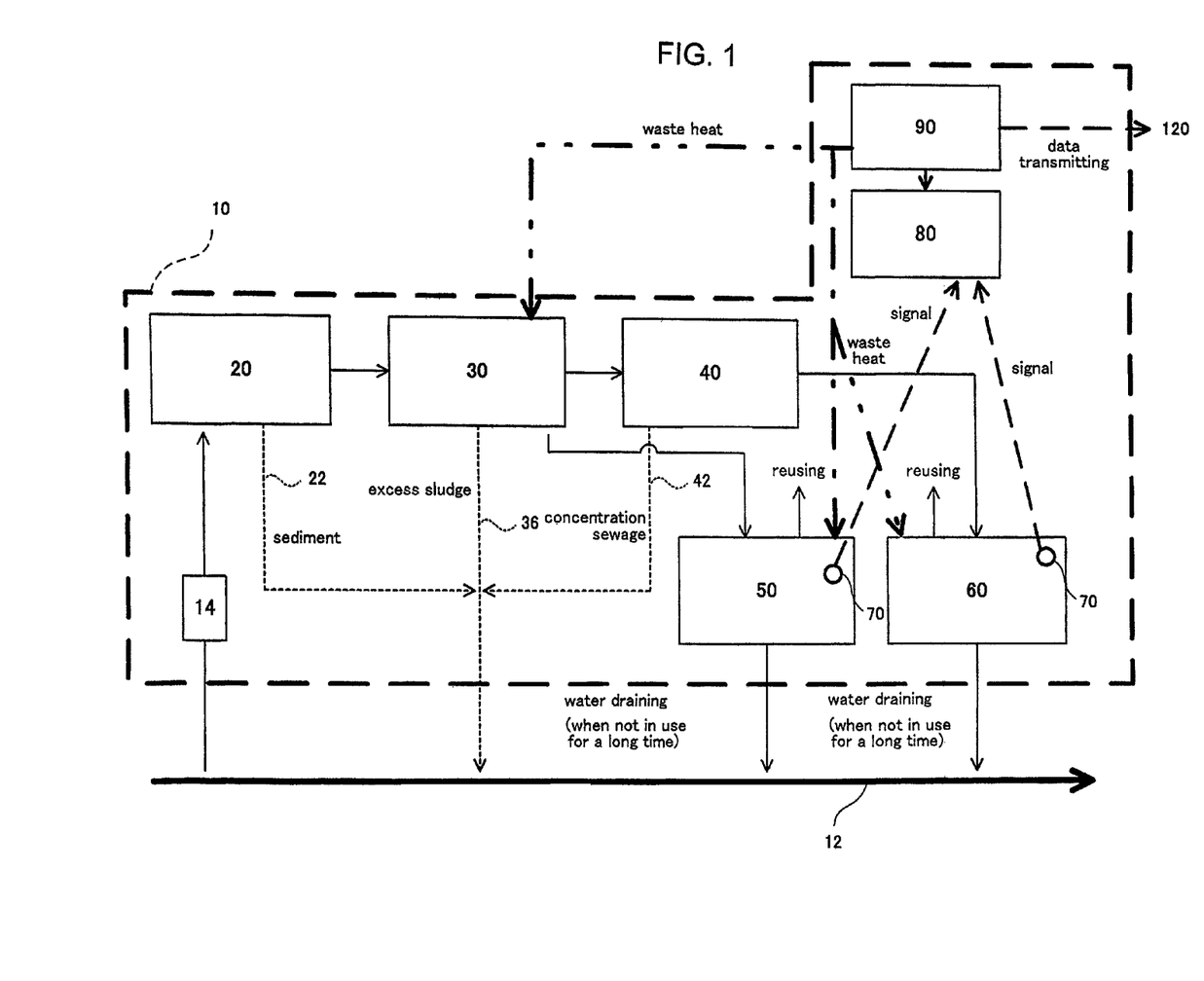
FIG. 1 is a summary diagram showing a structure of a sewage treatment apparatus of the present invention.
Figure 2:
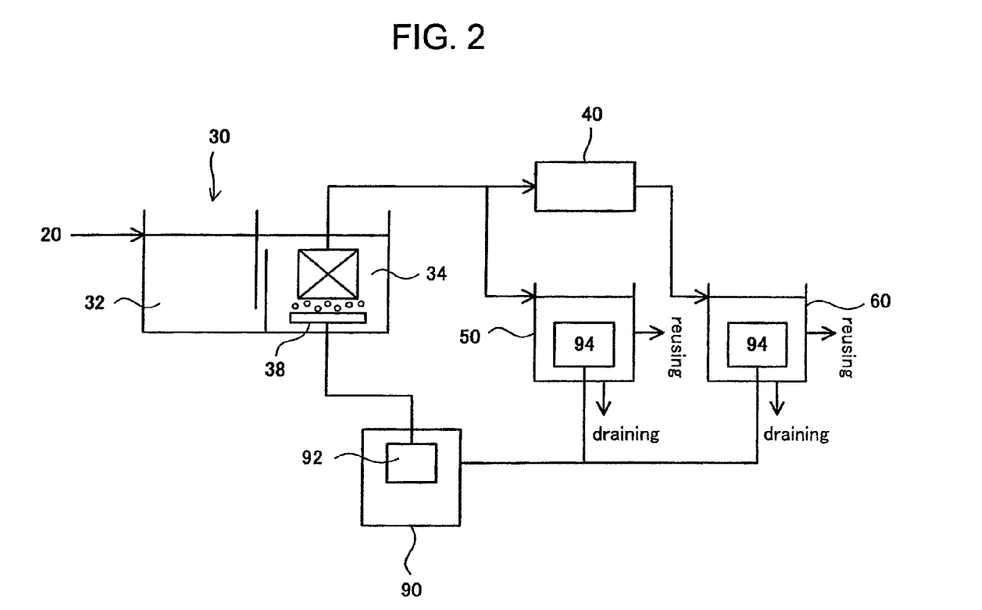
FIG. 2 is an explaining diagram of a sewage treatment apparatus, wherein waste heat is reused.

FIG. 1 is a summary diagram showing a structure of a sewage treatment apparatus of the present invention. FIG. 2 is an explaining diagram of a sewage treatment apparatus, wherein waste heat is reused. As shown in FIG. 1, a sewage treatment apparatus 10 mainly comprises a pretreating section 20, a membrane separation active-sludge treating section 30, a membrane highly treating section 40, a membrane treating tank 50, a membrane highly treating tank 60, several water level sensors 70, a power-control section 80, and a power supply 90. Further, the sewage treatment apparatus 10 is located anywhere along a sewer trunk line 12, as an example where the place is considered of being in demand for reuse water.

The pretreating section 20 is used for removing "sediment" from the sewage, before a sewage treatment which will be performed afterwards. For example, fiber filtering medium, screen and other materials can be used as the pretreating section 20. In details, the pretreating section 20 separates and removes suspending solid wastes included in the sewage as "sediment", by letting the sewage flow through the fiber filtering medium or the screen.

An induction pipe with a water introducing opening is mounted in the pretreating section 20, and the induction pipe connects the pretreating section 20 with the sewer trunk line 12. By means of a water introducing section 14 installed in the middle of the induction pipe, a part of sewage is introduced into the pretreating section 20 via the water introducing opening. The water introducing section 14 is formed, for example, by an electromagnetic valve or a suction pump. The pretreating section 20 further includes a draining pipe 22, which drains the "sediment" collected during the pretreatment back to the sewer trunk line 12. The draining pipe 22 is connected to the sewer trunk line 12 downstream from the water introducing opening, and the drained "sediment" will be treated by a terminal sewage treatment plant arranged at the end of the sewer trunk line 12.

The membrane separation active-sludge treating section 30 mainly comprises an anaerobic tank 32 and an aerobic tank 34. As shown in FIG. 2, the aerobic tank 34 is located next to the anaerobic tank 32, so that a circulation loop is built for letting active-sludge circulate from the aerobic tank 34 located downstream to the anaerobic tank 32 located upstream. The sewage is introduced from the pretreating section 20 into the anaerobic tank 32, and the anaerobic tank 32 performs a biological treatment through the active-sludge in order to generate treated sewage (i.e. first treated sewage). Then, the first treated sewage is introduced into the anaerobic tank 32, and the aerobic tank 34 performs a membrane separation through flat membrane soaked in the tank, in order to separate the active-sludge from the first treated sewage. Afterwards, the first treated sewage is introduced to the membrane highly treating section 40 or to the membrane treating tank 50 which will be described below. In the membrane separation active-sludge treating section 30, excess sludge is produced as a result of the growth of the active-sludge during the biological treatment. To drain the excess sludge back to the sewer trunk line 12, a draining pipe 36 is installed in the membrane separation active-sludge treating section 30. The draining pipe 36 is connected to the sewer trunk line 12 downstream from the water introducing opening, and the drained excess sludge will be treated by the terminal sewage treatment plant. Further, although as an example, the aerobic tank 34 of the present embodiment has been described as using flat membrane, any other hollow fiber membrane can also be used as a separation method and the material of the membrane is not restrict as long as the active-sludge can be separate from the first treated sewage.

The membrane highly treating section 40 is used for generating reuse water with high purity according to different uses of the reuse water. For example, reverse osmosis membrane (RO) and/or nanofiltration membrane (NF) can be used in the membrane highly treating section 40. The reverse osmosis membrane (RO) or the nanofiltration membrane (NF) is fixed in the fluid path of the first treated sewage, so that it is possible to purify the first treated sewage by letting it flow through the membrane. The reverse osmosis membrane can remove inorganic molecules from the first treated sewage to generate treated sewage (i.e. second treated sewage) that has the same purity as drinking water. Comparatively, the nanofiltration membrane can remove pigment components from the first treated sewage to generate second treated sewage that is transparent. In the membrane highly treating section 40, during the process of the membrane treatment, concentration sewage is produced as a by-product besides the generation of reuse water. To drain the concentration sewage back to the sewer trunk line 12, a draining pipe 42 is installed in the membrane highly treating section 40. The draining pipe 42 is connected to the sewer trunk line 12 downstream from the water introducing opening, and the drained concentration sewage will be treated by the terminal sewage treatment plant.

The membrane treating tank 50 is used for storing a part of the first treated sewage, which is generated through the biological treatment performed in the membrane separation active-sludge treating section 30, as reuse water. The membrane treating tank 50 contains a supply pipe and a draining pipe. The supply pipe supplies the reuse water to an area where reuse water is in demand, and the draining pipe drains the reuse water stored in the tank back to the sewer trunk line 12.

The membrane highly treating tank 60 is used for storing the second treated sewage, which is generated through the membrane separation performed in the membrane highly treating section 40, as reuse water. The membrane highly treating tank 60 contains a supply pipe and a draining pipe. The supply pipe supplies the reuse water to an area where reuse water is in demand, and the draining pipe drains the reuse water stored in the tank back to the sewer trunk line 12.

For measuring the water level (water storing quantity) of reuse water, water level sensors 70 are installed in both the membrane treating tank 50 and the membrane highly treating tank 60, The power-control section 80 is electrically connected with the water introducing section 14, the pretreating section 20, the membrane separation active-sludge treating section 30, the membrane highly treating section 40, water level sensors 70, and a valve (not shown). The power-control section 80 operates to control the water introducing section 14, the pretreating section 20, the membrane separation active-sludge treating section 30, and the membrane highly treating section 40.

The power supply 90 is installed in the sewage treatment apparatus 10 accompany with the power-control section 80, and supplies electric power to the power-control section 80.

For example, a fuel cell, or a family use generator such as a solar power source or a wind power source can be used as the power supply 90. Further, the power supply 90 can be formed as a supplement to a main power supply, and programmed to work in emergency such as in a disaster.

Furthermore, the power supply 90 includes a waste heat collecting section 92 (as shown in FIG. 2). The power supply 90 releases heat in the course of generating electricity. In the present invention, the released heat (i.e. waste heat) is collected by the waste heat collecting section 92, and is used in the sewage treatment.

As shown in FIG. 2, the waste heat collecting section 92 collects the waste heat released from the generator of the power supply 90, and temporarily stores it in a heat accumulating device. The waste heat collecting section 92 is connected with a plurality of heating sections. An embodiment of the heating section has a structure described below. The waste heat collecting section 92 is connected with a dispersing section 38 which is mounted in the aerobic tank 34 of the membrane separation active-sludge treating section 30. The dispersing section 38 bubbles hot air into the aerobic tank 34 so that the sewage which is being treated in the aerobic tank 34 can be heated to a proper temperature for biological treatment. As a result, the efficiency of the biological treatment performed through the active-sludge can be raised accordingly. The waste heat collecting section 92 is also connected with a couple of heat exchanging units 94 which are mounted respectively in the membrane treating tank 50 and the membrane highly treating tank 60. The waste heat collecting section 92 supplies hot liquid to the heat exchanging units 94 so that the treated sewage (i.e. reuse water) stored in the tanks can be heated for melting snow. Moreover, the heating method of the heating section is not limit to the dispersing section 38 and the heat exchanging units 94, as long as the treated sewage and the reuse water can be heated.

Furthermore, because the "sediment" which is newly produced by the sewage treatment apparatus 10, the excess sludge, and the concentration sewage are all drained back to the sewer trunk line 12 downstream from the water introducing opening, there is no need to install extra treating device. As a result, the setting space of the whole apparatus can be miniaturized.

The sewage treatment apparatus of the present invention, which has the structure described above, works in the following way.

Sewage is introduced from the sewer trunk line 12 into the pretreating section 20 through the water introducing section 14. The pretreating section 20 separates and removes the "sediment" included in the sewage in order to reduce the burden of the membranes treatment performed in the membrane separation active-sludge treating section 30 afterwards. The "sediment" is drained via the draining pipe 22 back to the sewer trunk line 12 downstream from the water introducing opening, and the sewage which has been treated by the pretreating section 20 is introduced into the membrane separation active-sludge treating section 30 in the back.

The membrane separation active-sludge treating section 30 performs the biological treatment in the anaerobic tank 32 through the active-sludge with a required concentration. Then, the sewage, which has been treated by the active-sludge, is introduced into the aerobic tank 34 located next to the anaerobic tank 32, and is separated from the active-sludge by flat membrane soaked in the aerobic tank 34. The excess sludge, which is produced as a result of the growth of the active-sludge during the biological treatment, is drain back to the sewer trunk line 12 via the draining pipe 36. A part of the first treated sewage is introduced into the membrane highly treating section 40, while the remaining is introduced into the membrane treating tank 50 and temporarily stored there.

In the membrane highly treating section 40, to generate the second treated sewage with a purity higher than that of the first treated sewage, the reverse osmosis membrane and/or the nanofiltration membrane is put into use according to different uses of reuse water. The second treated sewage, which is generated through the purification treatment, is introduced into the membrane highly treating tank 60 and temporarily stored there.

The power-control section 80 is in operation while the purification treatment described above is being performed. The demand information of reuse water, the (outer atmospheric) temperature or other weather information, the water level data about the water level (water storing quantities) of the treated sewage in the membrane treating tank 50 and the membrane highly treating tank 60 measured by water level sensors are transmitted to the power-control section 80. Furthermore, the power-control section 80 operates to control the water introducing section 14, the pretreating section 20, the membrane separation active-sludge treating section 30, and the membrane highly treating section 40, whose operating information is respectively inputted into the power-control section 80. Then, on the basis of the water level data, the demand for reuse water, and the (outer atmospheric) temperature or other weather information, the power-control section 80 adjusts water introducing quantity of the sewage introduced by the water introducing section 14, in order to adjust the water storing quantity of treated sewage in the membrane treating tank 50 and the membrane highly treating tank 60 to a desired water storing quantity. For example, in order to raise the water storing quantity, it is necessary to increase the water introducing quantity. Conversely, in order to lower the water storing quantity, it is necessary to decrease the water introducing quantity, or to drain the reused water stored in the tanks back to the sewer trunk line 12.

Furthermore, if the water storing quantity of the membrane treating tank 50 and/or the membrane highly treating tank 60 exceeds a preset water storing quantity but there is no demand for reuse water, to avoid the reuse water going bad, the reuse water stored in the tank will be drained back to the sewer trunk line 12 via a draining pipe.

Moreover, the power supply 90 supplies the power-control section 80 with electricity, and the waste heat collecting section 92 collects and stores the waste heat released from the generator. Further, the waste heat collecting section 92 is connected with the dispersing section 38 mounted in the aerobic tank 34 of the membrane separation active-sludge treating section 30, and the dispersing section 38 bubbles hot air into the aerobic tank 34. As a result, the sewage which is being treated in the aerobic tank 34 can be heated to a proper temperature for biological treatment, so that the efficiency of the biological treatment performed through the active-sludge can be raised accordingly. The waste heat collecting section 92 is also connected with a couple of heat exchanging units 94 which are mounted respectively in the membrane treating tank 50 and the membrane highly treating tank 60, and supplies hot liquid to the heat exchanging units 94.

With such sewage treatment apparatus, it is possible to store the reuse water generated by the membrane separation active-sludge treating section 30 or the membrane highly treating section 40 according to different purities. It is also possible to control the water storing quantity of the membrane treating tank 50 and/or the membrane highly treating tank 60 on the basis of the demand for reuse water, the temperature and the water lever data.

Furthermore, because the waste heat released from the power supply 90 is collected by the waste heat collecting section 92 and is used by the dispersing section 38 mounted in the aerobic tank 34 of the membrane separation active-sludge treating section 30, it is possible to heat the sewage to a proper temperature for the biological treatment in order to raise the efficiency of the biological treatment. The waste heat is also used by a couple of heat exchanging units 94 mounted respectively in the membrane treating tank 50 and the membrane highly treating tank 60, so it is possible to heat the reuse water according to different uses.

Figure 3:
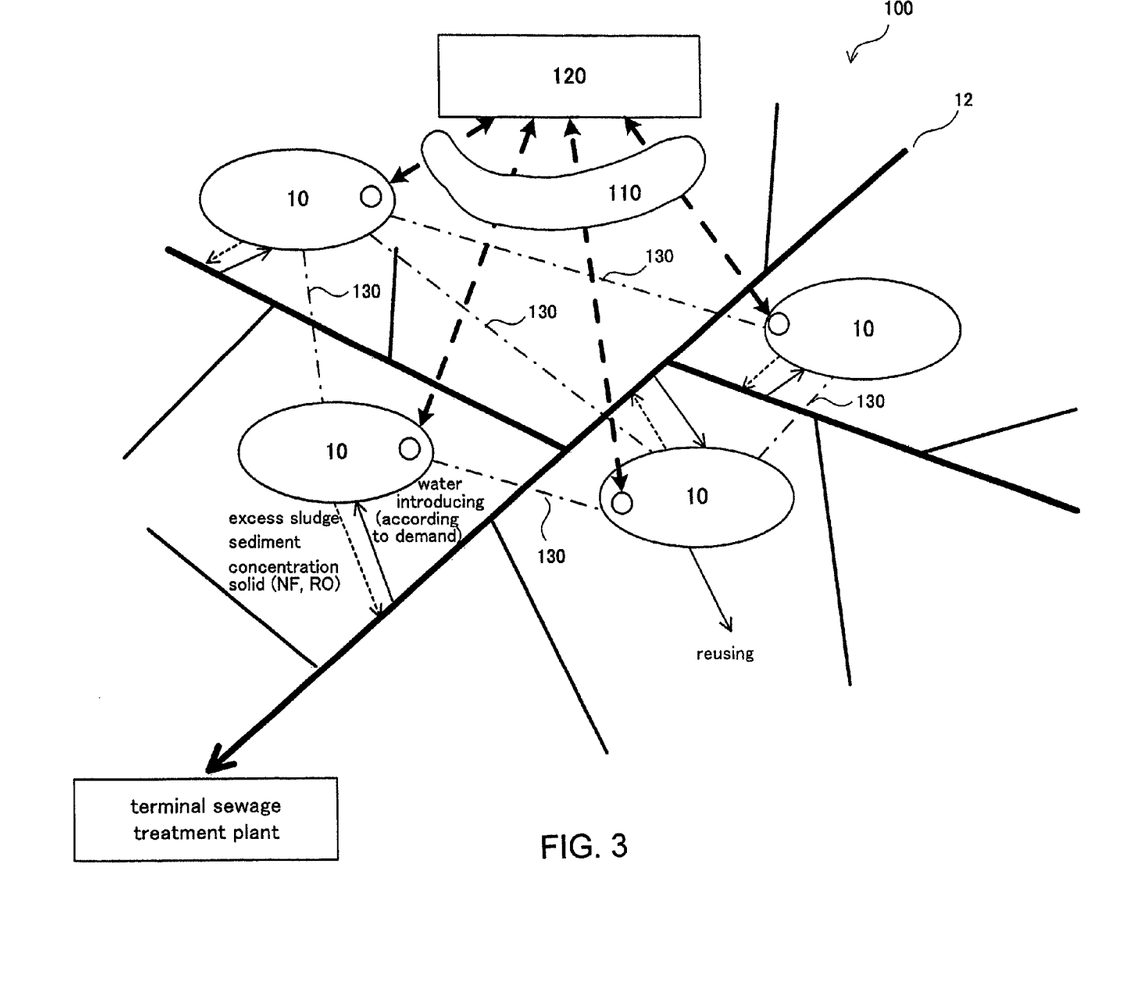
FIG. 3 is a summary diagram showing a structure of a sewage reuse system of the present invention.

A sewage reuse system of the present invention will be described below. FIG. 3 is a summary diagram showing a structure of the sewage reuse system of the present invention. The sewage reuse system 100 of the present invention mainly comprises a plurality of sewage treatment apparatuses 10, a communication section 110, and a central control section 120.

The structure of the sewage treatment apparatus 10 in present embodiment is shown in FIG. 1 and FIG. 2. A plurality of such sewage treatment apparatuses 10 are distributed along a sewer trunk line 12 in an area that is in demand for reuse water, Further, reuse water can be used as, for example, environment water in parks, water for melting snow, toilet water, sprinkling water, gardening water, domestic water in emergency and so on.

The power-control section 80 in each sewage treatment apparatus 10 contains a data sending source. The communication section 110 is a wired or wireless network, which connects all the data sending sources with a data receiving source installed in the central control section 120 which will be described below. There are a plurality of relay stations distributed among the communication section 110 according to the distance between those data sending sources and the data receiving source. For example a wireless network system, such as a mobile system or a Wireless LAN, can be used as a mean of communication.

Data transmitted from the data sending source of the power-control section 80, is, for example, the water storing quantities of the membrane treating tank 50 and the membrane highly treating tank 60; the water treating quantities of the membrane separation active-sludge treating section 30 and the membrane highly treating section 40; the water introducing quantity of the water introducing section 14; failure information of the membrane separation active-sludge treating section 30 and the membrane highly treating section 40; temperature, rain, snow or other weather information; and so on.

The central control section 120 mainly comprises a wireless receiver, a data processing device, and a monitor, and controls driving states of all the sewage treatment apparatuses 10 by a unified management. Specifically, the central control section 120 receives data about the driving state of each sewage treatment apparatus 10 via the wireless receiver. Further, the demand information of reuse water and weather information in the neighborhood of the satellite treatment plant is inputted into the data processing device of the central control section 120. On the basis of such information, the central control section 120 controls and adjusts the water storing quantity of each sewage treatment apparatus 10.

Furthermore, those sewage treatment apparatuses 10, which are distributed along the sewer trunk line 12 or sewer branch lines, are interconnected by a supply section 130 composed of a set of supply tubes. The supply section 130 is a network of many tubes and pumps, and it connects all the membrane treating tanks 50 that are located respectively in a plurality of sewage treatment apparatuses 10 with each other, as well as connects all the membrane highly treating tanks 60 that are located respectively in a plurality of sewage treatment apparatuses 10 with each other, in order to deliver the generated reuse water from one tank to others. Besides a set of supply tubes, the supply section 130 can also be a movable device such as a water supply truck, as long as those tanks located in different sewage treatment apparatuses 10 can replenish each other with treated sewage via the supply section 130.

The sewage reuse system 100, which has the structure described above, works in the following way. The water level data of all the membrane treating tanks 50 and the membrane highly treating tanks 60, which are located respectively in a plurality of sewage treatment apparatuses 10, is measured by a plurality of water level sensors 70. The water level data is transmitted to the power-control section 80 and is remembered there. Besides the water level data, the water treating quantity of the membrane separation active-sludge treating section 30 and the membrane highly treating section 40; the water introducing quantity of the water introducing section 14; failure information of the membrane separation active-sludge treating section 30 and the membrane highly treating section 40; temperature, rain, snow or other weather information; and so on, is also inputted into the power-control section 80. Such information is sent to the central control section 120 via the communication section 110.

The communication section 110 works in the following way. First, the data sending source sends data to all relay stations that are in reach. Then each of the relay stations forwards the received data to other relay stations that are in reach. By repeating the step described below, the data can be transmitted to the data receiving source of the central control section 120.

The driving information of all the sewage treatment apparatuses 10, the driving information in the past, the demand information of reuse water in the neighborhood, and temperature information, is inputted into the central control section 120. When the water storing quantity of one sewage treatment apparatus 10 is insufficient according to the demand information of reuse water, the central control section 120 performs control by increasing the water introducing quantity of the water introducing section 14 and performing the sewage treatment. As a result, the water storing quantity of the sewage treatment apparatus 10 can be raised to meet the demand. Moreover, the central control section 120 also controls and adjusts the water storing quantity on the basis of weather information and the consumption history of reuse water.

In another situation, when the water storing quantity of one sewage treatment apparatus 10 is considered to be insufficient (for example in a case that the demand goes beyond the limit of the sewage treating capacity of the sewage treatment apparatus 10) according to the demand information of reuse water, the weather information, or other factors, the central control section 120 performs control by drawing and supplying reuse water from membrane treating tanks 50 or membrane highly treating tanks 60 of other sewage treatment apparatuses 10 located in the neighborhood, via the supply section 130.

Furthermore, because all the membrane treating tanks 50 which are located in respective sewage treatment apparatuses 10 are connected with each other by a set of pumps, and all the membrane highly treating tanks 60 which are located in respective sewage treatment apparatuses 10 are also connected with each other by a set of pumps, it is possible to transfer reuse water among different areas according to the consumption condition of reuse water. The consumption condition of reuse water can be judged by measuring water level data of each membrane treating tank 50 and each membrane highly treating tank 60 through the water level sensor 70.

Moreover, it is also possible to transfer reuse water among different areas according to a demand forecasting which can be predicted on the basis of the demand history of reuse water and the temperature information.

With such sewage reuse system 100, it is possible to control water storing quantities of the plurality of sewage treatment apparatuses 10 by a unified management, and adjust the water storing quantities according to the demand for reuse water. It is also possible to replenish those sewage treatment apparatuses 10 according to the demand for reuse water, by transferring reuse water from other tanks to a tank located in an area where the reuse water is in shortage.

The invention claimed is:

1. A sewage reuse system, comprising:
    (a) a plurality of sewage treatment apparatuses, each comprising:
        a membrane separation active-sludge treating section which performs a biological treatment on a part of sewage, which is introduced by a water introducing section while flowing through a sewer trunk line, to generate first treated sewage;
        a membrane highly treating section which performs a membrane high treatment on said first treated sewage to generate second treated sewage;
        a membrane treating tank which stores a part of said first treated sewage;
        a membrane highly treating tank which stores said second treated sewage;
        water level sensors which respectively measure water level of said membrane treating tank and said membrane highly treating tank; and
        a power-control section which controls water introducing quantity of said water introducing section on the basis of the water level data measured by said water level sensors,
    (b) wherein said plurality of sewage treatment apparatuses are distributed in an area where there is a sewer trunk line, and
    (c) further comprising:
        a supply section which connects all said membrane treating tanks located in respective said sewage treatment apparatuses with each other, as well as connects all said membrane highly treating tanks located in respective said sewage treatment apparatuses with each other,
        a communication section which transmits driving information of respective said sewage treatment apparatus; and
        a central control section which supplies reuse water via said supply section to said membrane treating tank located in an area where reuse water is in shortage, supplies reuse water via said supply section to said membrane highly treating tank located in an area where reuse water is in shortage, and controls water storing quantity of each membrane treating tank and/or each membrane highly treating tank located in respective said sewage treatment apparatuses, on the basis of demand for reuse water and said driving information transmitted by said communication section.

2. The sewage reuse system according to claim 1, wherein said power-control section controls said water introducing quantity on the basis of temperature.

3. The sewage reuse system according to claim 1, further comprising:
    a power supply which is contained in said power-control section which drives said membrane separation active-sludge treating section and said membrane highly treating section,
    wherein waste heat released from said power supply is used by a plurality of heating sections mounted in said membrane separation active-sludge treating section, said membrane treating tank, and said membrane highly treating tank.

4. The sewage reuse system according to claim 1, wherein concentration sewage produced by said membrane highly treating section is drained back to said sewer trunk line downstream from a water introducing opening formed in said water introducing section.

5. A sewage reuse system, comprising:
    (a) a plurality of sewage treatment apparatuses, each comprising:
        a membrane separation active-sludge treating section which performs a biological treatment on a part of sewage, which is introduced by a water introducing section while flowing through a sewer trunk line, to generate first treated sewage;
        a membrane highly treating section which performs a membrane high treatment on said first treated sewage to generate second treated sewage;
        a membrane treating tank which stores a part of said first treated sewage;
        a membrane highly treating tank which stores said second treated sewage;
        water level sensors which respectively measure water level of said membrane treating tank and said membrane highly treating tank; and
        a power-control section which controls water introducing quantity of said water introducing section on the basis of the water level data measured by said water level sensors,
    (b) wherein said plurality of sewage treatment apparatuses are distributed in an area where there is a sewer trunk line, and
    (c) further comprising:
        a supply section which connects all said membrane treating tanks located in respective said sewage treatment apparatuses with each other, as well as connects all said membrane highly treating tanks located in respective said sewage treatment apparatuses with each other, a communication section which transmits driving information of respective said sewage treatment apparatus; and a central control section which supplies reuse water via said supply section to said membrane treating tank located in an area where reuse water is in shortage and supplies reuse water via said supply section to said membrane highly treating tank located in an area where reuse water is in shortage on the basis of demand for reuse water and said driving information transmitted by said communication section.

6. The sewage reuse system according to claim 5, wherein said power-control section controls said water introducing quantity on the basis of temperature.

7. The sewage reuse system according to claim 5, further comprising:

a power supply which is contained in said power-control section which drives said membrane separation active-sludge treating section and said membrane highly treating section, wherein waste heat released from said power supply is used by a plurality of heating sections mounted in said membrane separation active-sludge treating section, said membrane treating tank, and said membrane highly treating tank.

8. The sewage reuse system according to claim 5, wherein concentration sewage produced by said membrane highly treating section is drained back to said sewer trunk line downstream from a water introducing opening formed in said water introducing section.

* * * * *